(12) United States Patent
Thompson et al.

(10) Patent No.: US 9,708,066 B2
(45) Date of Patent: Jul. 18, 2017

(54) DEPLOYMENT MECHANISM FOR A DEPLOYABLE TABLE

(71) Applicant: Thompson Aero Seating Limited, Portadown, Craigavon (GB)

(72) Inventors: James Thompson, Kilkeel (GB); Keith Newell, Kilkeel (GB); Neil Rogers, Kilkeel (GB)

(*) Notice: Subject to any disclaimer, the term of this patent is extended or adjusted under 35 U.S.C. 154(b) by 0 days.

(21) Appl. No.: 14/870,424

(22) Filed: Sep. 30, 2015

(65) Prior Publication Data

US 2016/0090180 A1 Mar. 31, 2016

(30) Foreign Application Priority Data

Sep. 30, 2014 (GB) .................................. 1417239.9

(51) Int. Cl.
| | | |
|---|---|---|
| *A47B 39/00* | (2006.01) | |
| *B64D 11/06* | (2006.01) | |
| *B60N 3/00* | (2006.01) | |
| *A47B 13/08* | (2006.01) | |
| *F16C 19/50* | (2006.01) | |

(52) U.S. Cl.
CPC ........ B64D 11/0638 (2014.12); *A47B 13/081* (2013.01); *B60N 3/002* (2013.01); *F16C 19/50* (2013.01)

(58) Field of Classification Search
CPC ... B64D 11/0638; B60N 3/002; A47B 13/081; A47B 5/00; A47C 7/68; A47C 7/70; F16C 19/50
USPC .......... 108/42, 152; 297/144, 145, 143, 173, 297/174 R, 135, 160, 161
See application file for complete search history.

(56) References Cited

U.S. PATENT DOCUMENTS

| | | | | |
|---|---|---|---|---|
| 1,231,301 A | * | 6/1917 | Schlanger | ................ A47C 7/70 297/161 |
| 1,324,503 A | | 12/1919 | Hirsch | |
| 5,816,649 A | * | 10/1998 | Shields | ................ A47B 13/023 297/161 |

(Continued)

FOREIGN PATENT DOCUMENTS

| | | |
|---|---|---|
| DE | 102007050967 A1 | 4/2009 |
| EP | 2052906 A2 | 4/2009 |

OTHER PUBLICATIONS

European Search Report dated Jan. 21, 2016, for European patent application EP 15186233, corresponding to U.S. Appl. No. 14/870,424.

(Continued)

*Primary Examiner* — Jose V Chen
(74) *Attorney, Agent, or Firm* — Warner Norcross & Judd LLP (57) ABSTRACT

A deployment mechanism for a seat table has a non-linear motion slide comprising a primary carriage movable back and forth along a primary track. A secondary carriage is coupled to the primary carriage and moves with the primary carriage. A secondary non-linear track runs non-parallel with the primary track. The secondary carriage is coupled to the secondary track and is movable back and forth along the secondary track. The coupling between the secondary carriage and the primary carriage allows relative movement between the carriages in a transverse direction and allows relative rotation between the secondary carriage and the primary carriage about a perpendicular axis.

24 Claims, 6 Drawing Sheets

(56) References Cited

U.S. PATENT DOCUMENTS

| | | | | |
|---|---|---|---|---|
| 8,109,566 B2* | 2/2012 | Koh | ............... | A47C 7/70 297/145 |
| 8,256,835 B2* | 9/2012 | Brink | ............... | A47C 7/70 297/145 |
| 8,267,472 B2* | 9/2012 | Large | ............... | B60N 3/002 297/145 |
| 8,668,257 B2* | 3/2014 | Wu | ............... | A47C 7/70 248/446 |
| 2008/0252109 A1* | 10/2008 | Salzer | ............... | B60N 2/46 297/173 |
| 2010/0006364 A1* | 1/2010 | Koutsky | ............... | B60N 2/14 180/329 |
| 2011/0031785 A1* | 2/2011 | Steenson | ............... | A47C 7/543 297/161 |
| 2013/0093221 A1* | 4/2013 | Ligonniere | ............... | B64D 11/06 297/173 |

OTHER PUBLICATIONS

UK Search Report dated Apr. 9, 2015, for UK Application No. GB 1417239.9, corresponding to U.S. Appl. No. 14/870,424.

* cited by examiner

FIG. 2

FIG. 3 ies, particularly but not exclusively for deployable tables.
DEPLOYMENT MECHANISM FOR A DEPLOYABLE TABLE

FIELD OF THE INVENTION

The present invention relates to deployment mechanisms, particularly but not exclusively for deployable tables.

BACKGROUND TO THE INVENTION

Mechanisms for deploying articles such as tables are well known and can take many simple forms. However, in applications where the article is to be deployed in a confined space, for example where the article is a table for aircraft seating, conventional deployment mechanisms may be unsuitable for use.

It would be desirable therefore to provide a deployment mechanism that is suited to deploying articles in confined spaces, and is particularly suited to deploying tables for aircraft seating.

SUMMARY OF THE INVENTION

A first aspect of the invention provides a deployment mechanism as claimed in claim 1. The deployment mechanism comprises:
a non-linear motion slide comprising a primary track and a primary carriage movable back and forth along the primary track in a plane of movement;
a secondary carriage coupled to the primary carriage and movable with the primary carriage; and
a secondary track, at least part of said secondary track running non-parallel with said primary track,
wherein said secondary carriage is coupled to said secondary and movable back and forth along said secondary track,
and wherein the coupling between the secondary carriage and the primary carriage allows relative movement between said secondary carriage and said primary carriage in a direction transverse of said primary track, and allows relative rotation between said secondary carriage and said primary carriage about an axis substantially perpendicular to said plane of movement.

In typical embodiments, either one or both of said primary and secondary tracks are non-linear. Typically, said primary track and or said secondary track is curved, preferably arc-like. The primary and secondary tracks are preferably curved in the same sense.

The coupling between the secondary carriage and the primary carriage may comprise a pin and slot coupling, wherein one of a pin and a slot is provided on the primary carriage the other being provided on the secondary carriage, the pin being rotatable in the slot and slidable back and forth along the slot.

In preferred embodiments, the secondary track is disposed in the same plane as the primary track, or in a parallel plane, and is spaced apart from the first track in said transverse direction.

Typically at least a first part of the secondary track is substantially parallel with the primary track and at least a second part of the secondary track is non-parallel with the primary track. The second part may converge towards the primary track.

Advantageously, the non-linear motion slide is a roller slide comprising one or more rollers for facilitating movement of the primary carriage along the primary track. The or each roller is provided on the primary carriage and provides a rolling coupling between the primary carriage and the primary track.

In the preferred embodiment, the primary track comprises a non-linear rail curved to define a non-linear path for the primary carriage in the plane of movement.

More generally, the primary track may comprise a rail, the coupling between the primary track and primary carriage being provided by a pair of rollers, a respective one being in rolling engagement with a respective side of the rail.

Optionally, the coupling between the secondary carriage and the secondary track is a rolling coupling comprising one or more rollers. The or each roller may be provided on the secondary carriage and is in rolling engagement with a curved surface of the secondary track. Said curved surface may be provided by a wall of a channel that provides the secondary track.

Typically, the primary track and secondary track are provided on a base, the base being incorporated into a compartment, the compartment having a mouth; and/or the base may be part of a seat console. Said mouth may extend around a corner of said compartment.

In preferred embodiments, the secondary carriage carries a table, said table being movable between a deployed state and a stowed state by movement of said primary and secondary carriages along said primary and secondary tracks. In the stowed state the table may be located in said compartment, and in the deployed state said table is located outside of said compartment. The table may be disposed substantially in or parallel with said plane of movement when in said stowed state.

Typically, said table is disposed substantially in or parallel with said plane of movement during movement between said stowed and deployed states.

The mechanism may be incorporated into a seat console located laterally adjacent a seat or between two laterally adjacent seats. The or each seat may be an aircraft seat. Typically, in the deployed state said table is located in front of one of said adjacent seats.

The mechanism may include a clamp for clamping said primary carriage with respect to said primary track at an outer end of said primary track. The clamp may comprise one or more lips projecting over part of said primary track and being engagable with a respective portion of said primary carriage when said primary carriage is at said outer end.

Optionally, the mechanism includes a guide assembly comprising a guide rail and a guide runner, one being provided on the underside of the table the other being provided on the base, the guide rail and guide runner being mutually engagable to direct the movement of the table between its deployed and stowed states. The guide rail is curved to direct the table towards the inner end of the primary track when moving from the deployed state to the stowed state.

The mechanism may include a support pad being engagable with part of the primary and secondary carriage assembly when located at the outer end of the primary track to support the primary and secondary carriage in the direction of said axis that is substantially perpendicular to said plane of movement. Said assembly part may engage with an upper surface of said support pad.

Optionally the primary track, or at least part of it, is linear. For example the primary track includes one or more linear portion and one or more curved portion. Optionally the secondary track, or at least part of it, is linear. For example the secondary track includes one or more linear portion and one or more curved portion.

A second aspect of the invention provides a deployable table assembly comprising a table carried by the deployment mechanism of the first aspect of the invention.

A third aspect of the invention provides a seating installation comprising the deployable table assembly of second aspect of the invention incorporated into a seat console located laterally adjacent a seat or between two laterally adjacent seats.

Preferred features are recited in the dependent claims.

Preferred embodiments of the deployment mechanism facilitate deployment of a table in a confined space by manipulation of the curvature of the path taken by the table. Moreover, the preferred mechanism achieves this while providing smooth movement of the table and allowing deployment/stowage to be achieved by a simple pulling or pushing action.

Other advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which like numerals are used to denote like parts and in which.

DETAILED DESCRIPTION OF THE DRAWINGS

Referring now to the drawings, there is shown generally indicated as 10 a deployable table assembly embodying one aspect of the invention. The table assembly 10 comprises a table 12 that is movable between a deployed state (FIG. 1) and a stowed state (FIG. 2) by means of a deployment mechanism that is generally indicated as 14.

In preferred embodiments, the deployable table assembly 10 is part of a seating installation and as such is incorporated into a seat console 16 that may be located laterally adjacent a seat or between two laterally adjacent seats. Seats are not shown in the drawings but region A in FIG. 1 corresponds approximately to the seat pan of an adjacent seat and it will be apparent that the seat console 16 is located to the right of a seated person (not shown), the deployed table 12 being located in front of the seated person. In particularly preferred embodiments, the seat console 16 is located laterally adjacent, or between two laterally adjacent, aircraft seats. The console 16 may include a respective arm rest 17 for the, or each, adjacent seat, typically provided by or on an upper surface of the console 16. In some embodiments, the console 16 may be hollow and configured to provide a foot well for a seat in an adjacent (typically rearward) row.

When the table 12 is in its stowed state, it is typically located in a compartment 18 provided in the console 16. The compartment 18 has a mouth 20 through which the table 12 may pass during deployment/stowage. The mouth 20 typically opens onto two adjacent sides of the compartment 18, i.e. a corner opening as can best be appreciated from FIG. 3. The compartment 18 typically also has a cover 22, which is not shown in FIGS. 2 to 5 in order that the deployment mechanism 14 may be seen.

Figure 1:
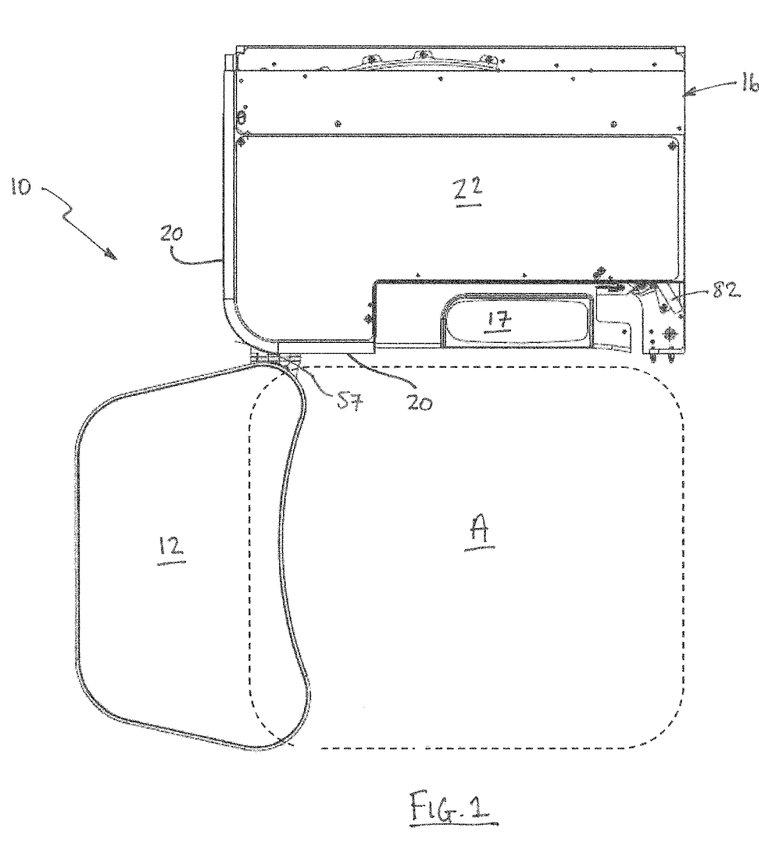
FIG. 1 is a plan view of a deployable table assembly for an aircraft seat embodying one aspect of the invention, the assembly including a table that is shown in a deployed state.
Figure 2:
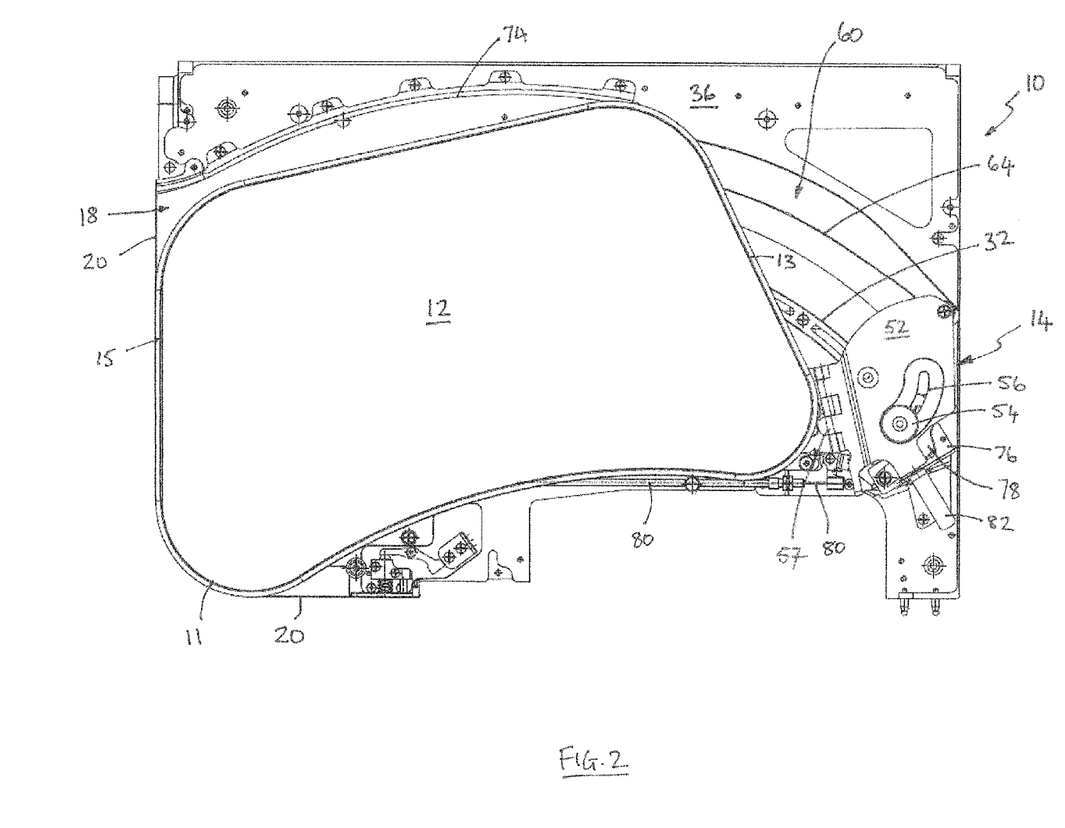
FIG. 2 is a plan view of the deployable table assembly of FIG. 1 shown in a stowed state and showing part of a deployment mechanism embodying another aspect of the invention.
Figure 3:
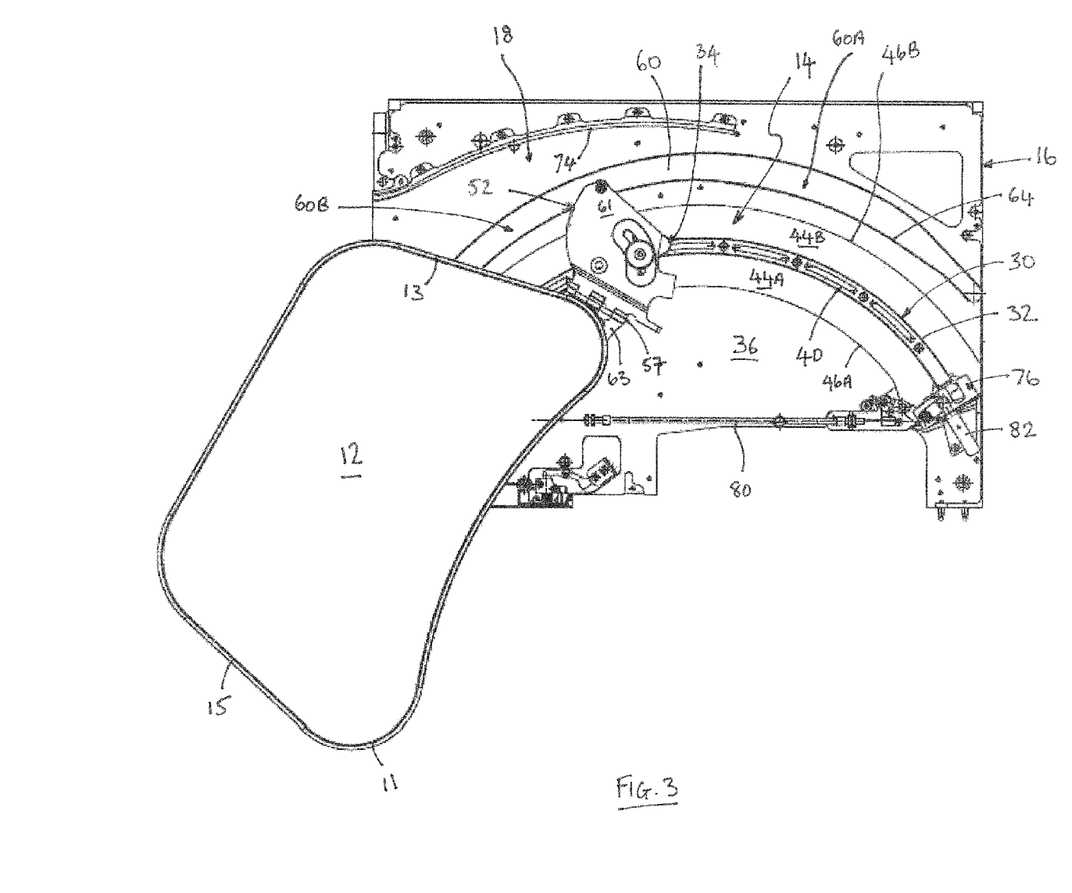
FIG. 3 is a plan view of the deployable table assembly and deployment mechanism of FIGS. 1 and 2 shown between the deployed and stowed states.
Figure 4:
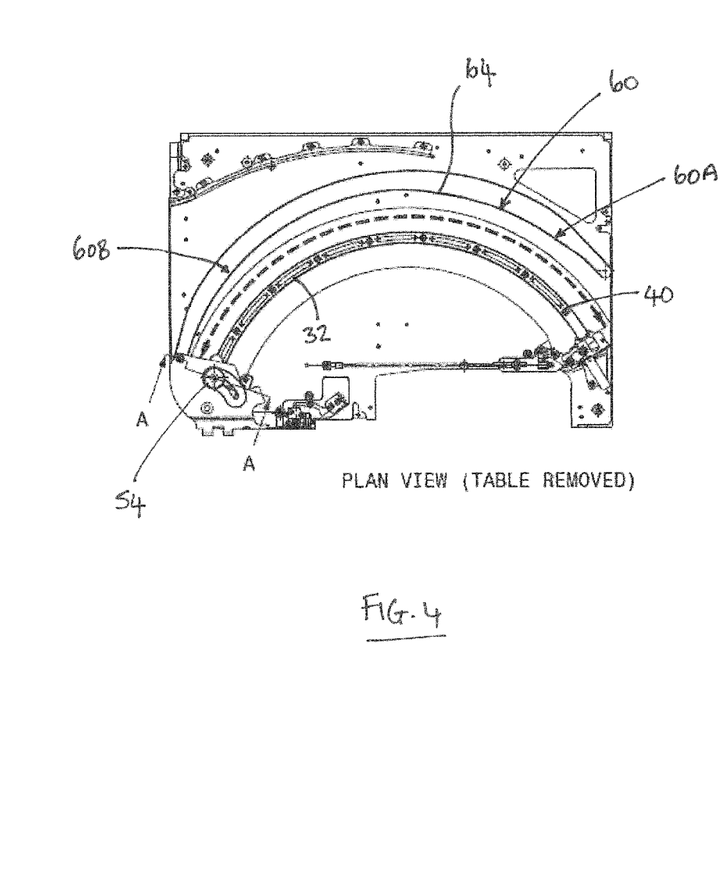
FIG. 4 is a plan view of the deployment mechanism of FIGS. 2 and 3.
Figure 5:
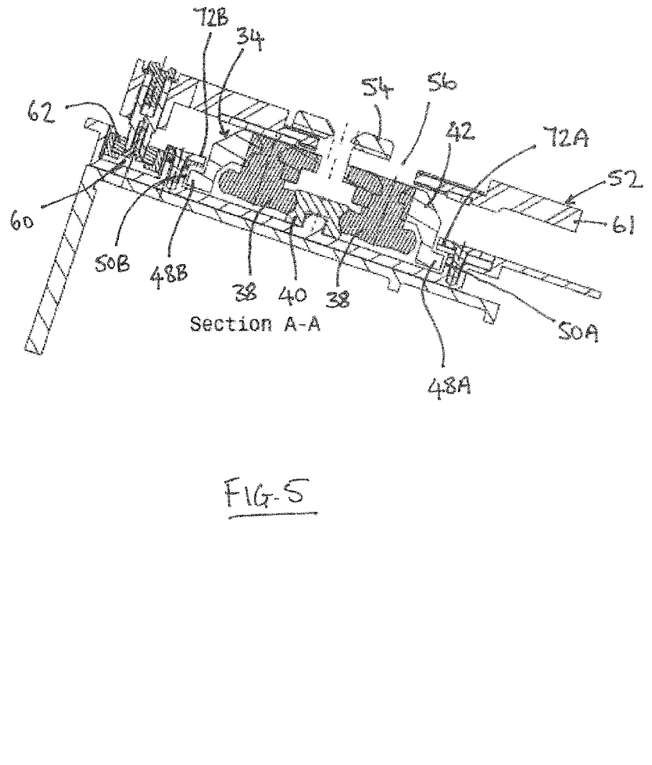
FIG. 5 is a side section view of the deployment mechanism of FIG. 4 mounted on a seat console for an aircraft seat.
Figures 6A, 6B:
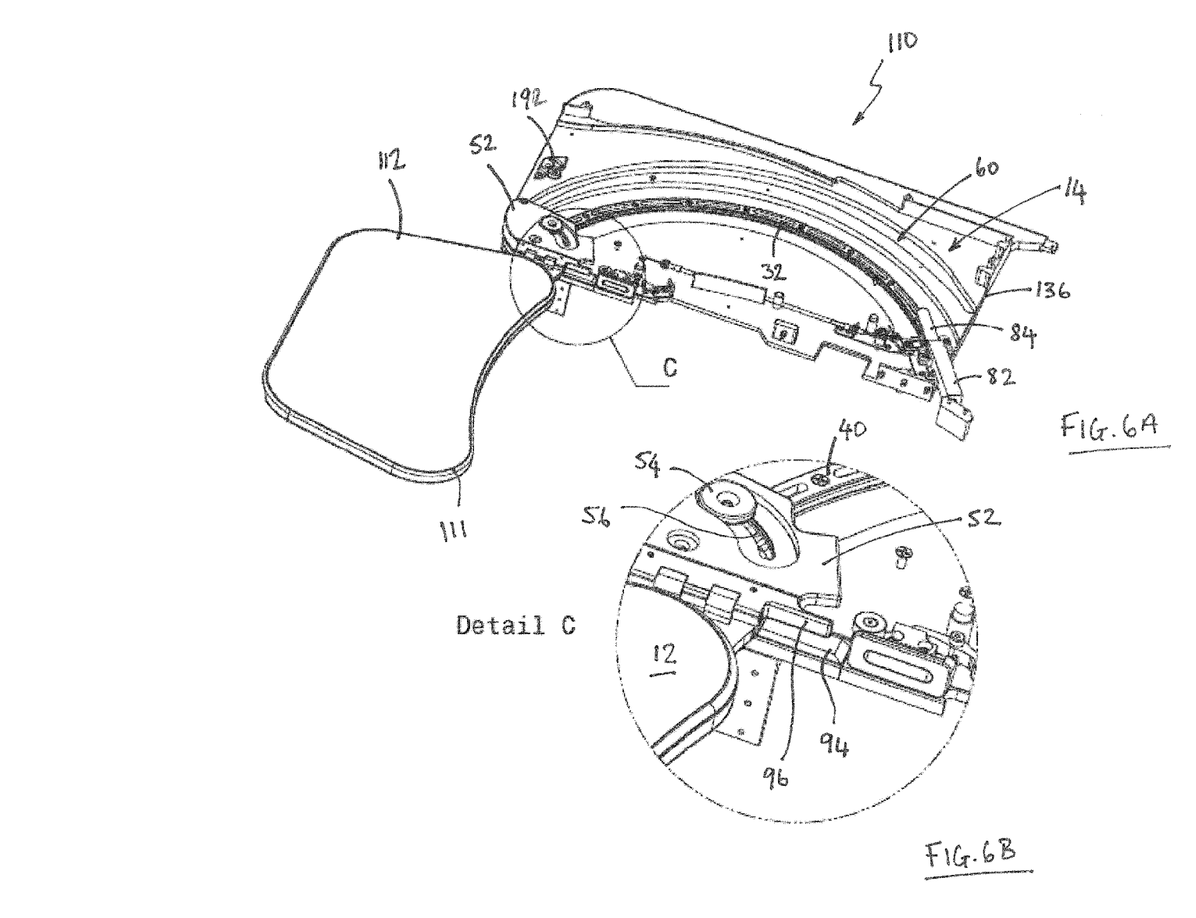
FIG. 6A is an isometric view of an alternative embodiment of a deployable table assembly including the deployment mechanism of FIGS. 2 to 4.
FIG. 6B is a detail view of part of the table assembly of FIG. 6A.
Figure 7:
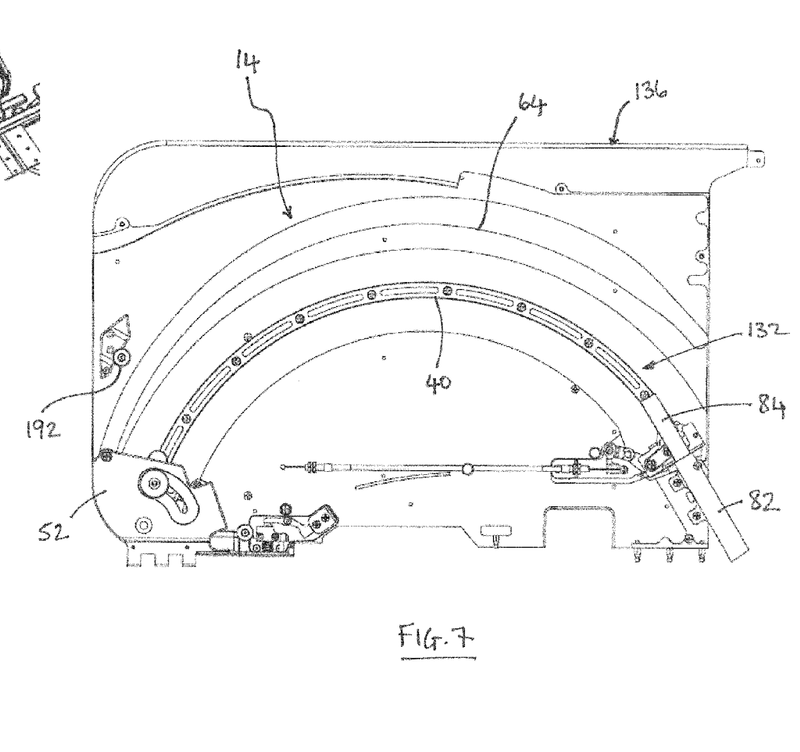
FIG. 7 is a plan view of the deployment mechanism of FIGS. 6A and 6B.
Figure 8:
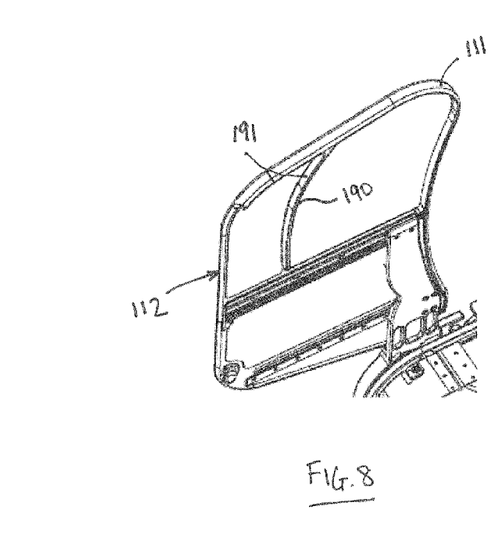
FIG. 8 is an isometric view of the underside of a table of the table assembly of FIGS. 6 and 7.

In preferred embodiments, the deployment mechanism 14 is configured to maintain the table 12 substantially in the same plane during movement between the deployed and stowed states. The plane is typically substantially horizontal, or more particularly substantially parallel with the floor surface (not shown) that supports the, or each, adjacent seat. Referring in particular to FIGS. 1 to 3, it may be seen that the table 12 maintains a substantially horizontal disposition in its deployed and stowed states and when moving between the two. The table 12 may be a single leaf table, for example as illustrated, or may comprise more than one leaf. In cases where the table comprises more than one leaf, the or each leaf may be deployed once the table 12 has reached the deployed state, or at least once the table 12 is out of the compartment 18.

The deployment mechanism 14 comprises a non-linear motion slide 30 comprising a primary track 32 and a primary carriage 34 that is movable back and forth along the primary track 32. The primary track 32 is disposed in a plane of movement and the primary carriage 34 is movable non-linearly in the plane of movement. In preferred embodiments, the plane of movement is substantially horizontal. The primary track 32, or at least part of it, is typically non-linear and may for example be curved, or arc-like. In the illustrated embodiment, the primary track 32, or at least part of it, is concave with respect to the desired end location of the article to be deployed. In the illustrated embodiment the primary track 32 is concave with respect to the seat associated with the table 12. In alternative embodiments (not illustrated), the primary track, or part of it, may be linear. For example the primary track may include one or more linear portion(s) and one or more curved portion(s), e.g. the track may be J shaped. The shape of the primary track may be determined by the characteristics of the required motion to be governed by the slide 30.

The primary track 32 is provided on a base 36, the base 36 being part of the seat console 16 in typical embodiments. In particular, the base 36 conveniently forms part of the compartment 18, for example providing the bottom surface of the compartment 18. The arrangement is such that the primary track 32 is located in the compartment 18, for example on the bottom surface of the compartment 18.

The slide 30 is preferably a roller slide and as such includes one or more rollers 38 for facilitating movement of the primary carriage 34 along the primary track 32. Typically, the or each roller 38 is provided on the primary carriage 34 and provides a rolling coupling between the primary carriage 34 and the primary track 32. Alternatively the roller(s) 38 may be provided on the primary track 32.

In preferred embodiments, the primary track 32 comprises a rail 40 that is curved to define a non-linear path for the primary carriage 34 in the plane of movement. The primary carriage 34 is coupled to the rail 40 for movement along its length. The coupling is provided by a pair of rollers 38, conveniently in the form of wheels, a respective one being in rolling engagement with a respective side of the rail 40. The primary carriage 34 has a body 42 on which the rollers 38 may be mounted in any convenient manner.

In preferred embodiments, the primary track 32 also comprises a non-linear channel 44A, 44B on at least one and preferably both sides of the rail 40, each channel 44A, 44B having a wall 46A, 46B that is spaced apart from the respective side of the rail 40 and has a curvature that matches the rail 40, i.e. the wall 46A, 46B runs parallel with the rail 40. The primary carriage 34 may engage with, and be slidable along, the wall 46A, 46B. To this end, the body 42 of the primary carriage 34 may optionally include a respective runner 48A, 48B for sliding engagement with the respective wall 46A, 46B, and the respective wall 46A, 46B may optionally have a respective groove 50A, 50B for receiving the respective runner 48A, 48B. Optionally, one or more rollers (not shown) may be provided on the wall 46A, 46B or primary carriage 34 to facilitate sliding movement of the carriage 34.

In alternative embodiments (not illustrated) the channel(s) 44A, 44B may be omitted or the rail 40 may be omitted. In the latter case, the primary track 32 may comprise a single channel with opposite walls 46A, 46B for engagement with the primary carriage 34.

In preferred embodiments, the deployment mechanism 14 includes a secondary carriage 52 coupled to the primary carriage 34. The coupling is such that the secondary carriage 52 moves with the primary carriage 34 as the primary carriage 34 moves back and forth along the primary track 32. However, the coupling also allows relative movement between the primary and secondary carriages 34, 52. In particular, the preferred coupling allows the secondary carriage 52 to rotate with respect to the primary carriage 34 about an axis that is substantially perpendicular to the plane of movement of the primary carriage 34. In addition, the preferred coupling allows the secondary carriage 52 to move, conveniently by sliding, relative to the primary carriage 34 in a direction that is transverse of the primary track 32. To this end, the coupling may comprise a pin 54 and slot 56 coupling whereby one of the pin 54 or slot 56 is provided on the primary carriage 34 and the other is provided on the secondary carriage 52. The pin 54 is rotatable in the slot 56 to allow the relative rotational movement, and is slidable back and forth along the slot 56 to allow the transverse movement. In preferred embodiments, the pin 54 is provided on the primary carriage 34 and the slot is provided on the secondary carriage 52.

The deployment mechanism 14 also includes a secondary track 60 that is typically non-linear. The secondary track 60 is disposed in the same plane as the primary track 32, or in a parallel plane, and is spaced apart from the first track 32 in the transverse direction. Typically, the secondary track 60, or at least part of it, is curved, or arc-like. Its curvature has the same sense as the curvature of the primary track 32, although the secondary track may be curved even if the primary track is not. The second track 60 is typically concave with respect to the desired end location of the article to be deployed. In the illustrated embodiment the secondary track 60 is concave with respect to the seat associated with the table 12. However, the secondary track 60, or at least part of it, is non-parallel with the primary track 32. This may be achieved by selection of the relative angular orientation of the tracks 32, 60 and/or their relative curvatures. In preferred embodiments, a first part 60A of the secondary track 60 is substantially parallel with the primary track 32 and a second part 60B of the secondary track 60 is non-parallel with the primary track 32. It is particularly preferred that the second part 60B converges towards the primary track 32. This may be achieved by increasing the curvature of the second part 60B of the secondary track 60 and/or adjusting the angular orientation of the second part 60B. In alternative embodiments (not illustrated), the secondary track, or part of it, may be linear. For example the primary track may include one or more linear portion(s) and one or more curved portion(s).

Conveniently, the secondary track 60 is provided on the base 36. The secondary track 60 may for example comprise a suitably curved rail or channel, or other protrusion or recess. In the illustrated embodiment, the secondary track comprises a channel formed in the base 36.

The secondary carriage 52 is coupled to the secondary track 60 for movement back and forth along the secondary track 60. The coupling is preferably a rolling coupling and as such includes one or more rollers 62, e.g. wheels, for facilitating movement of the secondary carriage 52 along the secondary track 60. Typically, the or each roller 62 (only one provided in the illustrated embodiment) is provided on the secondary carriage 52 and is in rolling engagement with a curved surface of the track 60. In the illustrated embodiment, the curved surface is provided by a wall 64 of the channel that provides the track 60. In this case, the curvature of the track 60 is effected by the curvature of the wall 64.

The secondary carriage 52 has a body 61 on which the roller 62 may be mounted in any convenient manner and in which the slot 56 may be formed.

In use, as the primary carriage 34 moves along the primary track 32, the secondary carriage 52 moves with the primary carriage 34 but also runs along the secondary track 60. When the secondary carriage 52 moves along any part of the secondary track 60 that is non-parallel with the primary track 32, the secondary carriage 52 is caused to move with respect to the primary carriage 34, in particular to pivot about the axis perpendicular to the plane of movement of the primary carriage 34 and to move in the transverse direction, as facilitated in this example by the pin 54 and slot 56 coupling. This relative movement between the primary and secondary carriages 34, 52 is caused by the carriages 34, 52 being made to move along respective non-parallel paths by their respective tracks 32, 60.

In preferred embodiments, one or more parts of the secondary track 60 is substantially parallel with the primary track 32 and one or more parts of it is non-parallel with the primary track 32. When the secondary carriage 52 runs in a parallel part it moves along the same path as the primary carriage 34, i.e. the path defined by the primary track 32. When the secondary carriage 52 runs in a non-parallel portion of the secondary track 60, its path deviates from the path defined by the primary track 32 because of the relative movement between the primary and secondary carriages 34, 52. In particular the rotational and transverse movement effected by the non-parallel part of the secondary track 60 sharpens the curvature of the movement of the secondary carriage 52 in comparison to the path defined by the primary track 32 (and still taken by the primary carriage 34). This is advantageous since it allows the path taken by the secondary carriage 52 (and therefore any article carried by it) to be manipulated to suit a confined space.

In preferred embodiments, the table 12 is carried by the second carriage 52, and may for example be fixed to the second carriage 52 by any convenient means, e.g. bolts, screws or other fixings. Typically, one side 13 of the table 12 is connected to the second carriage 52. Optionally, the table 12 is mounted on a portion 63 of the secondary carriage 52 that is pivotably coupled, e.g. by a hinge 57, to the body 60. The hinge 57 is preferably configured to allow the table to pivot about a substantially horizontal axis in use.

When the table 12 is in its stowed state, the primary and secondary carriages 34, 52 are located at a corresponding inner position on the primary track 32, typically the inner end of the track 32. At this position, the secondary carriage 52 is also coupled to the secondary track 60 at a corresponding inner position on its first part 60A, typically the inner end of the track 60. The compartment 18 is preferably shaped and dimensioned to contain the whole table 12 when stowed and so, with the carriages 34, 52 at the inner position the table 12 is located within the compartment 18, typically with its side 13 at the rear of the compartment 18 and the opposite side 15 at the mouth 20 (FIG. 2).

As the carriages 34, 52 move away from the inner position along the primary track 32, they follow the same path (i.e. the path defined by the primary track 32) so long as the secondary carriage 52 runs in the first part 60A of the secondary track 60. During this movement, the table 12 begins to deploy through the mouth 20 of the compartment 18. The curvature of the path taken by the table 12 during this movement is relatively shallow. This allows the table 12 to be accommodated in a relatively narrow compartment, which is advantageous in vehicle, particularly aircraft, seating, where the console 16 and therefore the compartment 18 are relatively narrow.

During further movement of the carriages 34, 52 away from the inner position, the secondary carriage 52, or more particularly its coupling roller 62, enters and runs along the second part 60B of the secondary track 60. The primary carriage 34 continues to follow the primary track 32 but the secondary carriage 52 additionally moves relative to the primary carriage 32 as described above. During this movement, the table 12 continues to deploy through the mouth 20 of the compartment 18 but the curvature of its path sharpens. This allows the table 12 to reach the desired position and orientation in the deployed state in relatively confined space. In the case of vehicle, especially aircraft, seating the space confinements are dictated by the distance to the seat in front and/or by seat width.

In typical embodiments, when the carriages 34, 52 reach respective outer positions in the tracks 32, 60 (typically at the respective outer ends of the tracks 32, 60), the table 12 is in its deployed state (FIG. 1). To help stabilize the table 12 in the deployed state, it is preferred to provide at least one clamp for holding the table 12. Optionally, a clamp may be incorporated into, or otherwise associated with, one or both of the tracks 32, 60 and may hold the table 12 indirectly by clamping a portion of the primary or secondary carriage 34, 52 as applicable. In preferred embodiments, a clamp is provided at the outer position of the primary track 32. The clamp may comprise a respective lip 72A, 72B that projects over the primary track 32, in particular the respective channels 44A, 44B at the outer end of the track 32. When the primary carriage 34 is at the outer end of the track 32 (i.e. when the table is fully deployed), the lips 72A, 72B engage with the carriage 34 to clamp it with respect to the track 32. In the illustrated embodiment, this is achieved by mutual engagement between the lips 72A, 72B and the respective runner 48A, 48B (in particular the underside of the lips with the top of the runners 48A, 48B). In cases where the runners are not present, a similar flange or other projection may by provided on carriage 34 for this purpose. The preferred clamp 72A, 72B is therefore a friction fit clamp.

When deployed, the table 12 may be pivoted up and down about hinge 57 to allow the passenger to leave the seat without stowing the table 12.

It will be apparent that the carriages 34, 52 and table 12 undergo the opposite movement to that described above when moving from the deployed state to the stowed state.

In preferred embodiments, the deployment mechanism 14 is manually operated. In the illustrated example this is achieved by a user pulling or pushing the table 12 into or out of the deployed state. In alternative embodiments (not illustrated), the deployment mechanism may be power-operable by one or more actuators.

In the illustrated embodiment, the deployment mechanism 14 includes a guide 74 for engaging with the table 12 during part of its movement between the deployed and stowed states. The guide 74 is typically located in the compartment 18 and may take the form of a rail. The guide 74 helps the table to move relatively smoothly and can help to keep the roller 62 engaged with the track 60 (if necessary).

Optionally, a latch 76 is provided for retaining the carriages 34, 52 in the inner position on the track 32, i.e. retaining the table 12 in the stowed state. The latch 76, which may for example be a spring-type latch, engages with and retains a portion 78 of either or both carriages 34, 52 when the carriages arrive at the inner position on track 32. The latch 76 is operable to release the portion 78, e.g. when it is desired to deploy the table 12. In the illustrated embodiment, the latch 76 is mechanically operated by a cable 80 connected between the latch 76 and a user-operable control (not shown), which may for example take the form of a button or switch located on the console 16. Conveniently, the latch 76 is located at the inner position of the track 32.

Optionally, an actuator 82 is positioned to engage with the carriage assembly 34, 52 when at the inner position of the track 32 and being operable to push the carriage assembly 34, 52 away from its stowed state. The actuator 82 may have a spring biased rod 84 for engaging with the carriage assembly 34, 52, and being depressed against its spring bias when the table 12 is stowed. When the table 12 is to be deployed, and in particular when the latch 76 is released, the rod 84 is extended by the spring bias to push against the carriage assembly 34, 52 and so to assist in the deployment of the table 12.

Referring now in particular to FIGS. 6A, 6B, 7 and 8, there is shown an alternative deployable table assembly 110 with table 112. The table assembly 110 is substantially similar to the table assembly 10 and unless otherwise indicated the same description applies and like numerals are used to denote like parts. In particular the table assembly 110 includes the essentially same deployment mechanism 14 but with some modifications as are now described. It will be understood that these modifications may equally be incorporated into the table assembly 10.

The table assembly 110 includes a guide assembly for assisting movement of the table 112 into its stowed state. The guide assembly comprises a curved guide rail 190, preferably provided on the underside of the table 112, and a guide runner 192, preferably provided on the base 36. The runner 192 preferably comprises a roller, e.g. a wheel. The rail 190 has a curvature that is similar to that of the track 32. The rail and runner 190, 192 are positioned to engage with one another as the table 112 moves between its deployed and stowed states, and particularly as the table moves from the deployed state to the retracted state. In the illustrated embodiment, the runner 192 engages with the outer surface 191 of the guide rail 190. During movement of the table 112 towards the stowed state, the interaction between the rail 190 and runner 192 helps to direct the table 112 towards the inner end of the track 32. In particular, it is preferred that the user is able to deploy and stow the table 12, 112 by pulling and pushing on a proximal corner 11, 111. The interaction of the rail 190 and runner 192 facilitates this particularly when the table 112 is being stowed since force exerted by the user on corner 111 (which tends to be transverse with respect to the track 32) is translated into movement towards the inner end of the track 32 by the rail 190 and runner 192. In alternative embodiments, the rail may be provided on the base and the runner may be provided on the underside of the table.

It will be apparent from the foregoing that the preferred deployment mechanism 14 facilitates the deployment of the table 12 in a confined space by manipulation of the curvature of the path taken by the table 12. Moreover, the preferred mechanism 14 achieves this while providing smooth movement of the table 12 and allowing deployment/stowage to be achieved by a simple pulling or pushing action.

Preferably, a support pad 94 is provided for engaging with a corresponding support part 96 of the carriage assembly 34, 52, which in this example is conveniently part of the body 61 of the secondary carriage 52. The pad 94 may be provided on the base 36, typically adjacent the outer end of the primary track 32. The support pad 94 and support part 96 are positioned to engage with on another when the table 112 is in its fully deployed state, the preferred arrangement being such that there is a friction fit between the pad 94 and part 96 when engaged. In the illustrated embodiment, the part 96 slides over the pad 94 to engage with it. In alternative embodiments, the arrangement may be such that the pad 94 is elevated from the base 36 to allow the part 96 to slide beneath it to engage. In either case, the carriage assembly, and table 112, is support in the vertical direction by the interference between the pad 94 and part 96. One or other or both of the support pad 94 and support part 96 are formed from a material, for example nylon or other plastics, with a sufficient degree of flexible resilience to facilitate the preferred friction fit. When engaged, the support pad 94 and support part 96 stabilise the table 112 in its deployed state and improve its load-bearing capabilities.

It will be understood that the respective configuration of the tracks 32, 60, including their length, curvature, orientation and/or spacing, can be chosen to suit any specific application and need not necessarily be the same to that described herein.

It will also be understood that while the invention is particularly suited for use in the deployment of tables, particularly with respect to a seat, especially an aircraft or other vehicle seat, the invention is not limited to such applications.

The invention is not limited to the embodiment(s) described herein but can be amended or modified without departing from the scope of the present invention.

The invention claimed is:

1. A deployment mechanism comprising:
   a non-linear motion slide comprising a primary track and a primary carriage movable back and forth along the primary track in a plane of movement;
   a secondary carriage coupled to the primary carriage and movable with the primary carriage; and
   a secondary track, at least part of said secondary track running non-parallel with said primary track, wherein said secondary carriage is coupled to said secondary track and movable back and forth along said secondary track, and wherein the secondary carriage is coupled to the primary carriage to allow relative movement between said secondary carriage and said primary carriage in a direction transverse of said primary track, and allows relative rotation between said secondary carriage and said primary carriage about an axis substantially perpendicular to said plane of movement.

2. The mechanism of claim 1, wherein either one or both of said primary and secondary tracks are non-linear.

3. The mechanism of claim 2, wherein either one or both of said primary and secondary tracks are curved.

4. The mechanism of claim 2, wherein the primary and secondary tracks are curved in a same sense.

5. The mechanism of claim 1, wherein the secondary carriage is coupled to the primary carriage by a pin and a slot, wherein one of the pin and the slot is provided on the primary carriage the other being provided on the secondary carriage, the pin being rotatable in the slot and slidable back and forth along the slot.

6. The mechanism of claim 1, wherein the secondary track is disposed in the same plane as the primary track, or in a parallel plane, and is spaced apart from the primary track in said transverse direction.

7. The mechanism of claim 1, wherein at least a first part of the secondary track is substantially parallel with the primary track and at least a second part of the secondary track is non-parallel with the primary track.

8. The mechanism of claim 7, wherein said second part converges towards the primary track.

9. The mechanism of claim 1 wherein the non-linear motion slide is a roller slide comprising one or more rollers for facilitating movement of the primary carriage along the primary track.

10. The mechanism of claim 1, wherein the primary track comprises a non-linear rail curved to define a non-linear path for the primary carriage in the plane of movement.

11. The mechanism of claim 1, wherein the primary track comprises a rail, the primary track is coupled to the primary carriage by a pair of rollers, and a respective one of the rollers is in rolling engagement with a respective side of the rail.

12. The mechanism of claim 1, wherein the coupling between the secondary carriage and the secondary track is a rolling coupling comprising one or more rollers.

13. The mechanism of claim 1, wherein the primary track and secondary track are provided on a base, the base being incorporated into a compartment, the compartment having a mouth.

14. The mechanism of claim 1, wherein the primary track and secondary track are provided on a base, the base being part of a seat console.

15. The mechanism of claim 1, wherein said secondary carriage carries a table, said table being movable between a deployed state and a stowed state by movement of said primary and secondary carriages along said primary and secondary tracks.

16. The mechanism of claim 15, wherein said table is disposed substantially parallel with said plane of movement during movement between said stowed and deployed states.

17. The mechanism of claim 15 incorporated into a seat console located laterally adjacent a seat.

18. The mechanism of claim 17, wherein in the deployed state said table is located in front of said adjacent seat.

19. The mechanism of claim 15, further including a guide assembly comprising a guide rail and a guide runner, one being provided on an underside of the table the other being provided on a base, the guide rail and guide runner being mutually engagable to direct the movement of the table between its deployed and stowed states.

20. The mechanism of claim 19, wherein the guide rail is curved to direct the table towards an inner end of the primary track when moving from the deployed state to the stowed state.

21. The mechanism of claim 1, further including a clamp for clamping said primary carriage with respect to said primary track at an outer end of said primary track, said clamp comprising one or more lips projecting over part of said primary track and being engagable with a respective portion of said primary carriage when said primary carriage is at said outer end.

22. The mechanism of claim 1, further including a support pad being engagable with part of the primary and secondary carriage when located at an outer end of the primary track to support the primary and secondary carriage in the direction of said axis that is substantially perpendicular to said plane of movement, wherein said part engages with an upper surface of said support pad.

23. A deployable table assembly comprising a table carried by the deployment mechanism of claim 1.

24. A seating installation comprising the deployable table assembly of claim 23 incorporated into a seat console located laterally adjacent a seat or between two laterally adjacent seats.

* * * * *